METHOD AND APPARATUS FOR SOLDERING ELECTRICAL LEADS TO TERMINALS ON A CORE AND COIL ASSEMBLY
Original Filed Jan. 30, 1967 4 Sheets-Sheet 1

Inventor:
Robert H. Parsons,
by [signature]
Attorney.

INVENTOR.
Robert H. Parsons,
by [signature]
Attorney.

METHOD AND APPARATUS FOR SOLDERING ELECTRICAL LEADS TO TERMINALS ON A CORE AND COIL ASSEMBLY

Original Filed Jan. 30, 1967 4 Sheets-Sheet 3

INVENTOR.
Robert H. Parsons,
BY [signature]
Attorney.

METHOD AND APPARATUS FOR SOLDERING ELECTRICAL LEADS TO TERMINALS ON A CORE AND COIL ASSEMBLY

Original Filed Jan. 30, 1967 4 Sheets-Sheet 4

INVENTOR.
Robert H. Parsons,
by Henry J. Marcinick
Attorney.

3,585,708
METHOD AND APPARATUS FOR SOLDERING ELECTRICAL LEADS TO TERMINALS ON A CORE AND COIL ASSEMBLY

Robert H. Parsons, Danville, Ill., assignor to General Electric Company

Continuation of application Ser. No. 612,517, Jan. 30, 1967. This application Dec. 5, 1969, Ser. No. 878,974
Int. Cl. B23k 31/02
U.S. Cl. 29—471.3 6 Claims

ABSTRACT OF THE DISCLOSURE

A method and apparatus for soldering electrical leads to terminals of a magnetic core and coil assembly. The method includes the step of moving a core and coil assembly past a flow of solder to solder the leads and terminals. Predetermined lengths of leads are positioned adjacent to terminal pads on the assembly. With the leads held in place, the terminals and leads are wetted as at least the ends of the leads traverse the crest of a cascade of solder. The direction of the solder flow is controlled so that solder will not contact the core and coil. In the apparatus, a rail of a conveyor both supports the terminal pads and gauges the length of lead inserted in the terminals. The conveyor includes a trough along which the free ends of the leads may slide. The conveyor moves the assembly along a solder emitting orifice. As the terminals traverse the orifice at least the ends of the leads contact the flow of solder to wet the ends of the leads and adjacent portions of the terminals with molten solder.

This is a continuation of Ser. No. 612,517, filed Jan. 30, 1967, now abandoned.

BACKGROUND OF INVENTION

This invention relates to method and apparatus for soldering electrical leads to inductive devices, such as the core and coil assemblies of ballast transformers.

In the fluorescent lamp ballast industry it has been necessary in the past to manually solder a plurality of long leads (2 to 4 feet each) to ballast core and coil assemblies. The soldering operation has consumed large amounts of time since it has generally been necessary to individually handle each of the relatively long electrical leads, and manually position each lead with respect to a particular solder terminal on the inductive device at a soldering station while manually soldering each of the leads to the terminals. Often the terminals have been covered with an asphaltic treat material, and in such cases extra time and special attention has been required to make a good solder connection. When the terminals have been covered with treat it has usually been necessary to keep each individual point of connection heated with a soldering iron until a sufficient amount of solder has melted and been applied to the joint to clean away the treat material. In practice, the manual soldering of leads has been even more tedious and time consuming because of the need to use extra care in preventing molten solder from splashing onto or contacting the thinly insulated wires in the core and coil assembly.

Another problem encountered when manually soldering each electrical lead has been related to the consistency of the connections and difficulty of making visual inspections of the connections. In the past it has been necessary to manually handle the inductive device after performance of the soldering operation. In addition to being time consuming, this manual handling has made it relatively easy to disturb and adversely affect the soldered connections before they had cooled properly. In addition, the consistency of final soldered connections has tended to vary depending on the proficiency of the individual operator who made the connection and it has been difficult to visually inspect and compare the final soldered connections because of the nonuniform application of solder.

It is, therefore, desirable to devise a method and apparatus for connecting electrical leads to solder terminals on inductive devices which will rapidly and efficiently produce consistently satisfactory solder connections. When making these connections it is desirable that the connections be exposed to sufficient amounts of solder so that treat material will be washed away. However, it is also desirable, if not necessary, that insulation and layers of wire in the coil assemblies be protected from molten solder as well as the various fluxing agents that may be used.

SUMMARY

It is a general object of this invention to provide an improved method and apparatus for making a soldered connection between electrical leads and the terminals of an inductive device.

Another object of this invention is to provide a new and improved method and apparatus that eliminates the need for manually soldering electrical leads and terminals of core and coil assemblies.

Yet another object of the present invention is to provide a method and apparatus which effectively makes use of a particularly controlled cascade of flux and solder.

In accordance with the invention, there is provided a method of connecting electrical leads to terminals supported from a magnetic core and coil assembly. The method includes effecting a predetermined relative motion between the core and coil assembly and a flow of molten solder to wet the electrical leads and adjacent portions of the terminals.

Also in accordance with the invention there is provided an apparatus for soldering electrical leads to solder terminals on a core and coil assembly. The apparatus comprises means for maintaining a reservoir of molten solder, means for generating a flow of molten solder and means for maintaining a surface of the flow at a predetermined height. Preferably, means are also provided for applying a fluxing agent to the electrical leads and the solder terminals prior to or during the soldering operation. Means are also provided for limiting the length of stripped electrical lead that can be inserted through solder terminals on the inductive device, holding electrical leads in a desired position relative to the inductive device, and conveying the inductive device and leads through a fluxing and soldering station. Preferably, the apparatus includes support rails along which the terminal pads of the inductive devices may slide and an elongated trough in which the free ends of the electrical leads may slide. In the preferred embodiment of the invention, flux and solder orifices directionally control cascades of flux and solder.

The subject matter which I regard as my invention is set forth in the appended claims. The invention itself, however, together with further objects and advantages thereof may be understood by referring to the following description taken in connection with the accompanying drawings in which:

DESCRIPTION OF THE PREFERRED EMBODIMENT

Figure 1:
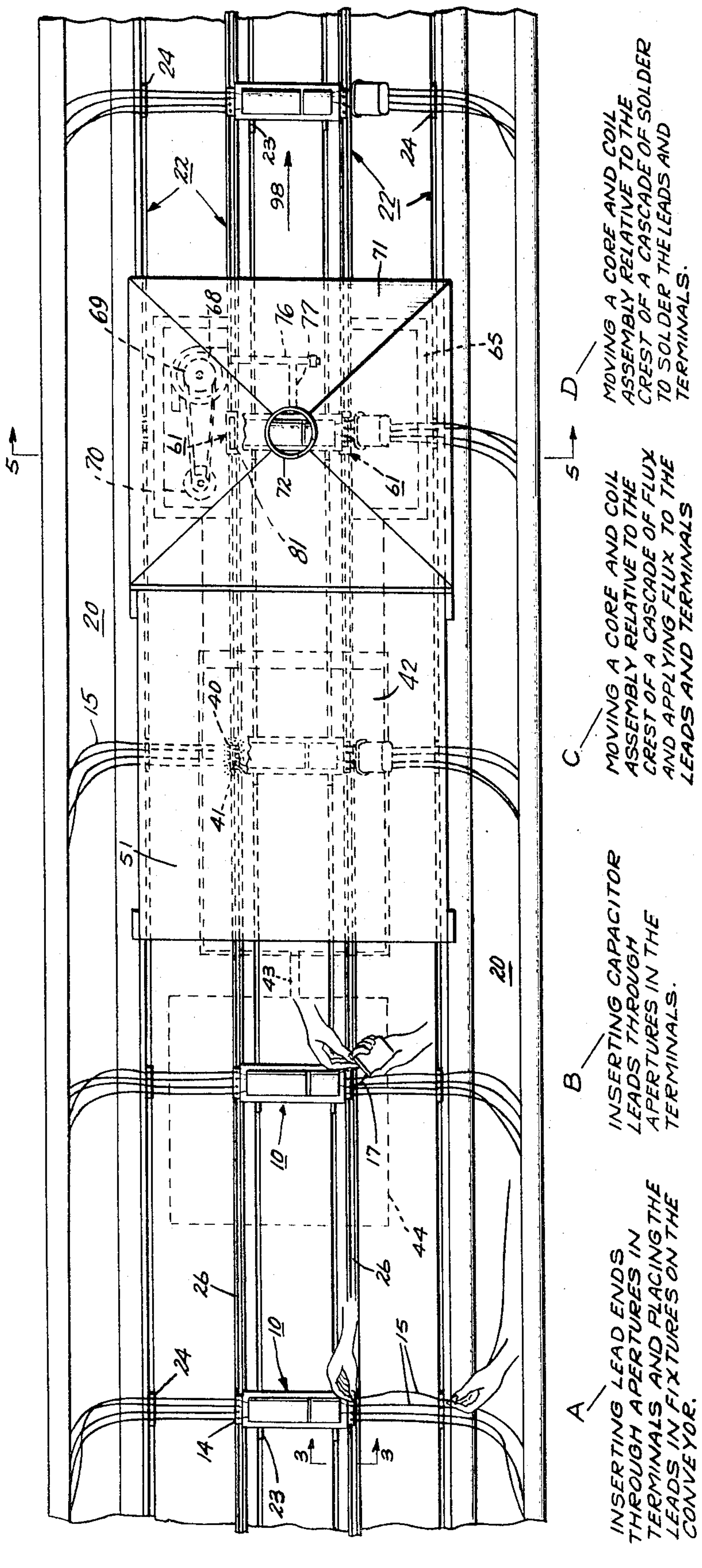
FIG. 1 is a plan view of apparatus in accordance with the invention and illustrates diagrammatically with legends the sequence of the various steps of the method according to one form of the invention.
Figures 3, 4, 6:
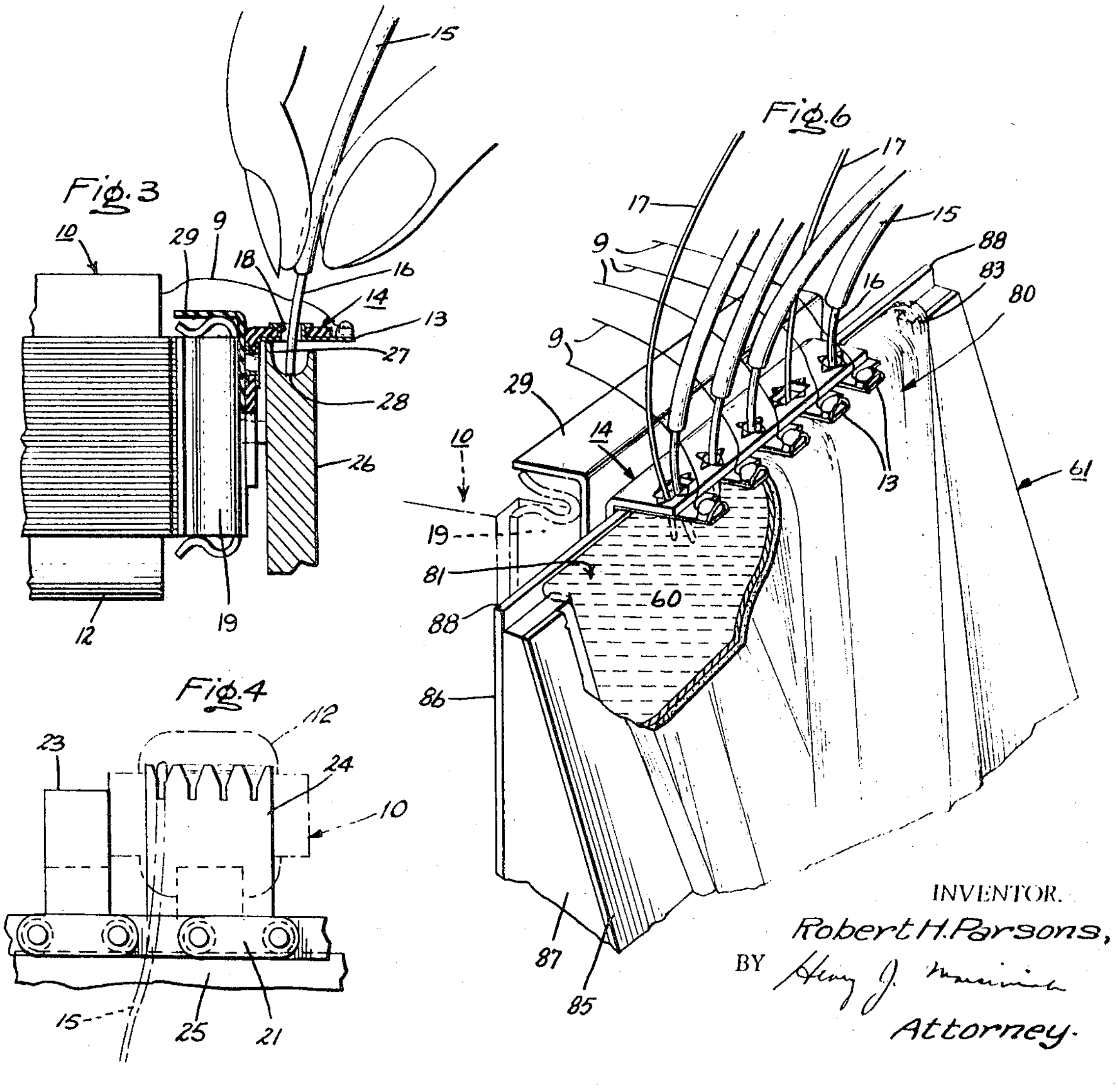
FIG. 3 is an enlarged sectional view taken along the lines 3—3 in FIG. 1 showing a conveyor rail supporting the terminal pad of an inductive device and limiting the amount of lead being inserted through openings in the pad.
FIG. 4 is a detailed view of a portion of a conveyor used in the apparatus shown in FIG. 1.
FIG. 6 is an enlarged perspective view of an orifice in accordance with the invention.

In FIG. 1 of the drawings, I have illustrated the stations at which are performed the steps of the method according to one embodiment of the invention. At Station A, the inductive devices 10 are manually positioned on a conveyor means generally denoted by the numeral 22 and the leads 15 are positioned relative to the inductive devices 10. Stripped portions 16 of electrical leads 15 are manually inserted through openings 18 in solder terminals 13 mounted on the inductive devices 10 as shown generally in FIG. 1 and in detail in FIG. 3. As shown in FIG. 3, only limited lengths of the stripped lead portions 16 are inserted through the solder terminal openings 18. The coil leads 9, also shown in FIG. 3, are soldered to terminals 13 during a previous operation and are insulated from the core by insulating pad 29. The leads 9 have been shown in this exemplification for completeness of the disclosure.

Again having reference to FIG. 1, as a portion of an electrical lead 15 is inserted through an opening in a solder terminal 13 the lead 15 is pulled toward the side of the conveyor 22 and inserted in a lead holder 24. Since the conveyor 22 is continuously moving in the direction of arrow 98 the inductive device 10 and leads 15 are carried from Station A to Station B with loose portions of the leads 15 sliding along the troughs 20 which are positioned along both sides of the apparatus.

At Station B the leads 17 of electrical components to be used with the inductive device are manually inserted through holes in the terminals in a manner generally similar to the placement of leads 15. In the embodiment illustrated there is shown the step of manually inserting leads 17 of a capacitor through the solder terminal openings. Preferably, only limited lengths of the capacitor leads are inserted through the solder terminal openings. In the embodiment, after the capacitor leads 17 are inserted in solder terminals 13 they are frictionally held in the solder terminal apertures 18 and serve as cantilever supports for the capacitor.

In the preferred embodiment, flux is applied to the terminals and leads at Station C and then the core and coil assemblies are moved through Station D where leads 16, 17 are soldered to the terminals 13 by the application of solder which will also wash asphaltic treat material away from the terminals.

In accordance with the invention, the fluxing material and molten solder are applied to the solder terminals 13 and leads 16, 17 while moving the inductive device 10 alongside cascades of flux and solder. Also in accordance with the invention, the cascades of flux and solder are directed laterally to one side of the Stations C and D as shown in FIG. 1. I have found that when the level of the crests of the flux and solder cascades is controlled, as will hereinafter be more fully explained, and the cascades are directed as shown in FIG. 1, the flux and solder are prevented from impregnating the coil assembly 12 in the inductive device 10.

Figure 5:
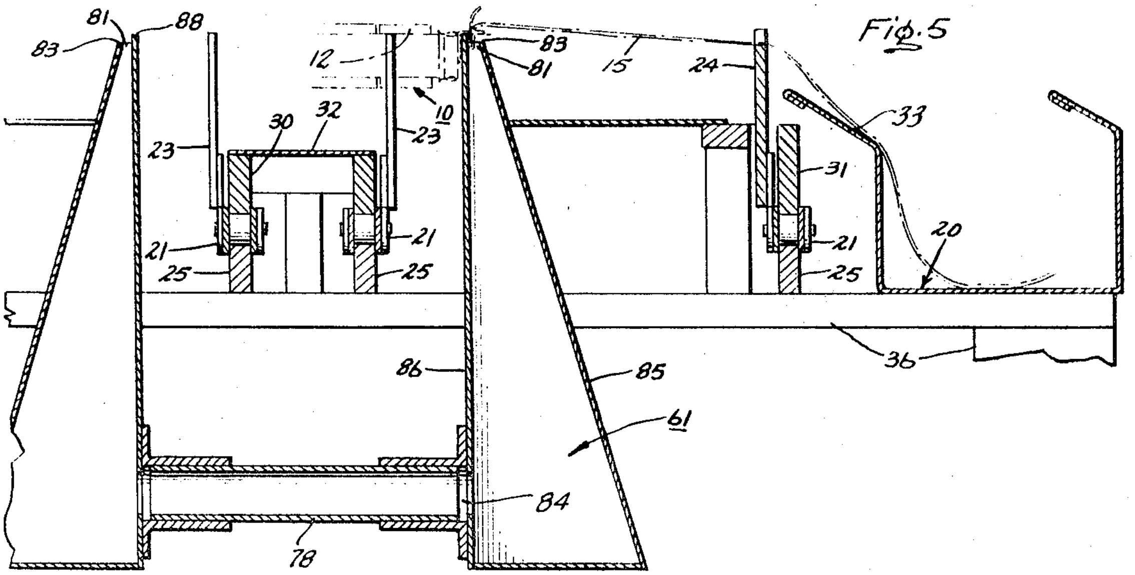
FIG. 5 is an enlarged portion of a sectional view taken on the lines 5—5 in FIG. 1.

With reference to FIG. 5, it will be understood that as the inductive device 10 moves adjacent to the cascades of flux and solder at least a portion of the coil assembly 12 of the inductive device is positioned below the crest of the cascades. It will thus be seen that by shielding the core and coil assembly from the solder and directing the cascades away from the coil assembly 12, the windings in the coil assembly will not be splashed with flux or solder. It should also be remarked, with reference to the flux Station C, that the relative position of the inductive device 10 and the cascade of flux is generally the same as the relative position of the inductive device 10 and the cascade of solder 80 as shown in FIG. 5.

Referring again to FIG. 1, after the leads 16 and 17 have been soldered to the solder terminals 13 on the inductive device 10, the solder connection cools as the inductive device 10 is moved away from the soldering Station D toward the discharge end of the apparatus.

Figure 2:
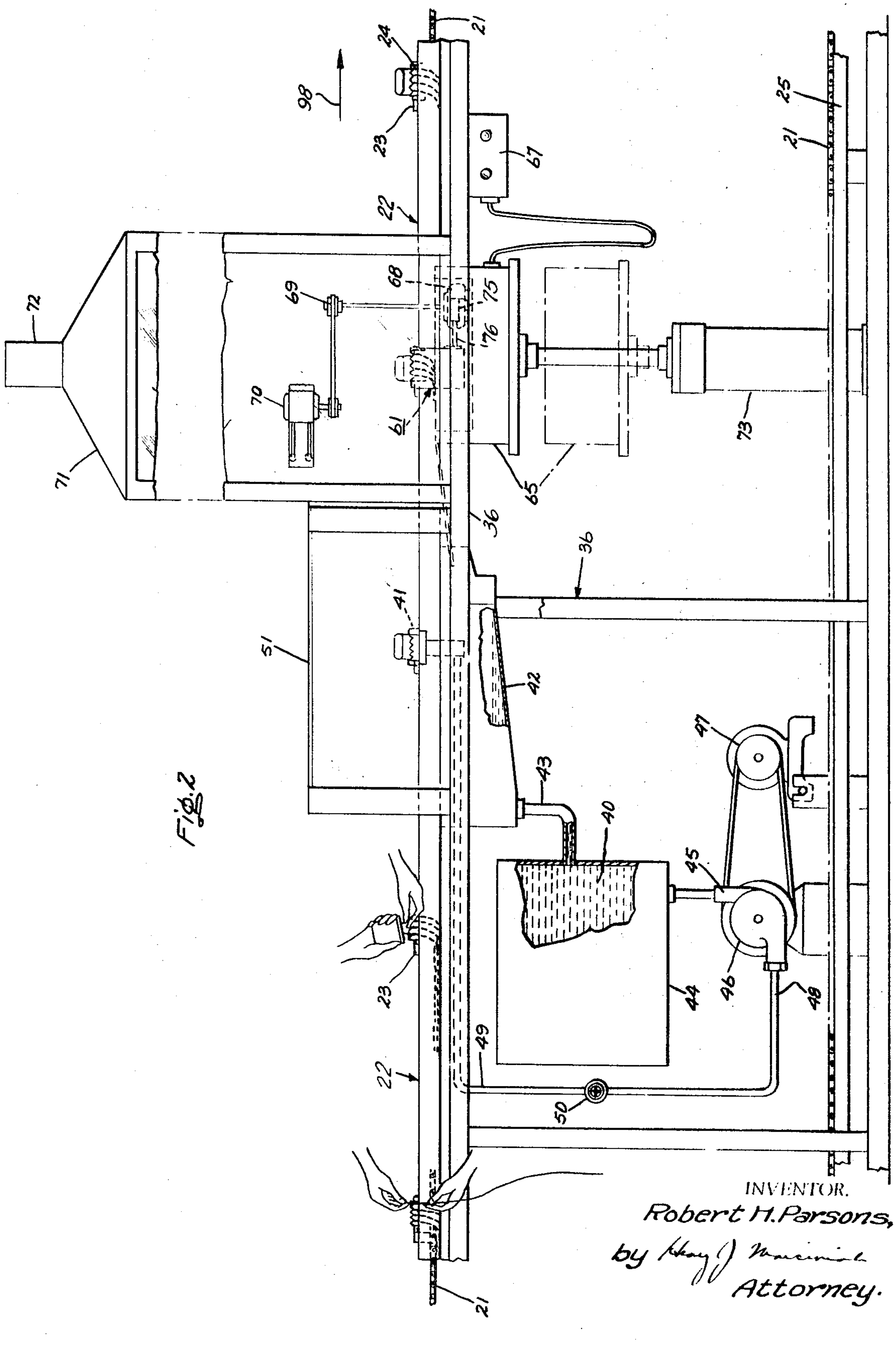
FIG. 2 is a front elevation of the apparatus shown in FIG. 1.

Having more specific reference to FIGS. 2 through 7, the apparatus disclosed herein by way of a specific exemplification of the invention will now be more fully described. In FIG. 2, it will be seen that the inductive devices 10 are moved by a continuous conveyor 22 through the work Stations A, B, C and D. The conveyor 22 includes four substantially identical roller chains 21 on which I have mounted attachments 23 and 24 as shown in FIGS. 4 and 5. As revealed in FIG. 5, the endless roller chains 21 are supported by roller tracks 25. The endless chains pass around idler sprockets at the head end of the conveyor and pass around four driven sprockets at the discharge end of the conveyor. The driven sprockets are fixed to a drive shaft having a pulley keyed thereto as is well known in the art, and power is transmitted to the pulley through a conventional speed reducer from an electric motor (not shown). Although FIG. 5 is a partial sectional view of the apparatus, it will be understood that the apparatus there shown is substantially symmetrical about the center line of FIG. 5 and that two of the roller chains 21 run along the center portion of the apparatus between supporting rails 26. The other two chains 21 move adjacent to each edge of the apparatus.

In order to slide the inductive device 10 along an extended edge 27 of support rails 26, pusher means are attached to the central pair of roller chains. In the exemplification, the pusher means are in the form of plates 23 attached by any suitable means such as, for example, spot welding. I have also provided means for holding the electrical leads 15 in position relative to the inductive device 10. In the exemplification this means is illustrated as fixtures 24 having notches for frictionally gripping the leads 15. Tracks 30 overlie the central pair of roller chains 21 and prevent buckling of the conveyor during operation. Tracks 31 are provided over the outer pair of chains 21 for the same reason.

To forestall tangling and snagging of leads 15, the free portions of the electrical leads 15 are pulled into and slide along the troughs 20. Cover plates 32 and 33 are provided over the endless chains 21 to prevent accidents and these plates are held in place by any suitable support means mounted on conventional understructure 36.

During operation, terminal pads 14 slide along the extended edge 27 of rails 26, across the lips of the flux and solder orifices and back onto the rail edge 27. In addition to supporting the inductive devices 10, the rails 26 provide a convenient means of measuring the length of lead 15 that is inserted through the openings 18 in the terminal pads 14. Still having reference to FIG. 3, it will be seen that the contoured portion 28 of the rail 26 will operate as a gauge to limit the amount of conductor 15 as it is inserted through the solder terminals 13 from a wide range of angles.

Returning now to FIG. 2, the exemplification of the flux Station C will be described. A pair of flux orifices 41 generate cascades of a fluxing material 40. When the exemplification was reduced to practice, the configuration of the flux orifice 41 was generally the same as the solder orifice 81 shown in FIG. 6. Essentially the only difference between the two orifices was that the flux orifice 41 had a somewhat smaller longiturinal dimension than the solder orifice. As a result of the difference, the crest of the flux cascade was not as wide as the crest of the solder cascade.

As will be understood from FIG. 2, the flux 40 cascades over the outer side of the flux orifice and into a sump 42. From the sump 42 the flux drains through a conduit 43 into a storage tank 44 and from there is pumped from the pump inlet 45 through a conduit 48 and back to the flux orifices. The pump 46 is driven at a substantially constant speed by the electric motor 47 and the height of the flux crests are controlled by adjustment of the valve 50 in the conduit 49. As will be hereinafter more fully explained in the description of the solder orifice 81 the crests of the cascades of flux and solder are maintained at a relatively uniform predetermined level to flux, and wet with solder at least the ends of the electrical leads 16, 17.

The supporting rails 26 of the conveyor system butt against the ends of each of the flux orifices 41 at Station C and as the inductive devices are moved by pushers 23, the terminal pads 14 slide from the supporting rails 26, across the upper lips of orifices 41 and back onto the supporting rails 26. In order to control the emission of vapors from the flux station, a Plexiglas hood 51 is connected to a vented hood 71. As will be understood, fumes from the fluxing and soldering stations are exhausted through conduit 72 above the solder Station D.

To facilitate maintenance and production line modifications, a heated solder pot 65 is adjustably supported by a fluid cylinder 73. In addition, a control 67 is conveniently mounted and connected to the solder pot 65 to supply power to the heating elements 66 embedded in the pot to maintain the temperature of the molten solder 60 within a preselected range. Also shown in FIG. 2 is a conventional variable speed drive 69 through which motor 70 drives an impeller type solder pump 68. By adjustment of the variable speed drive the discharge pressure of the solder 60 may be controlled.

Figure 7:
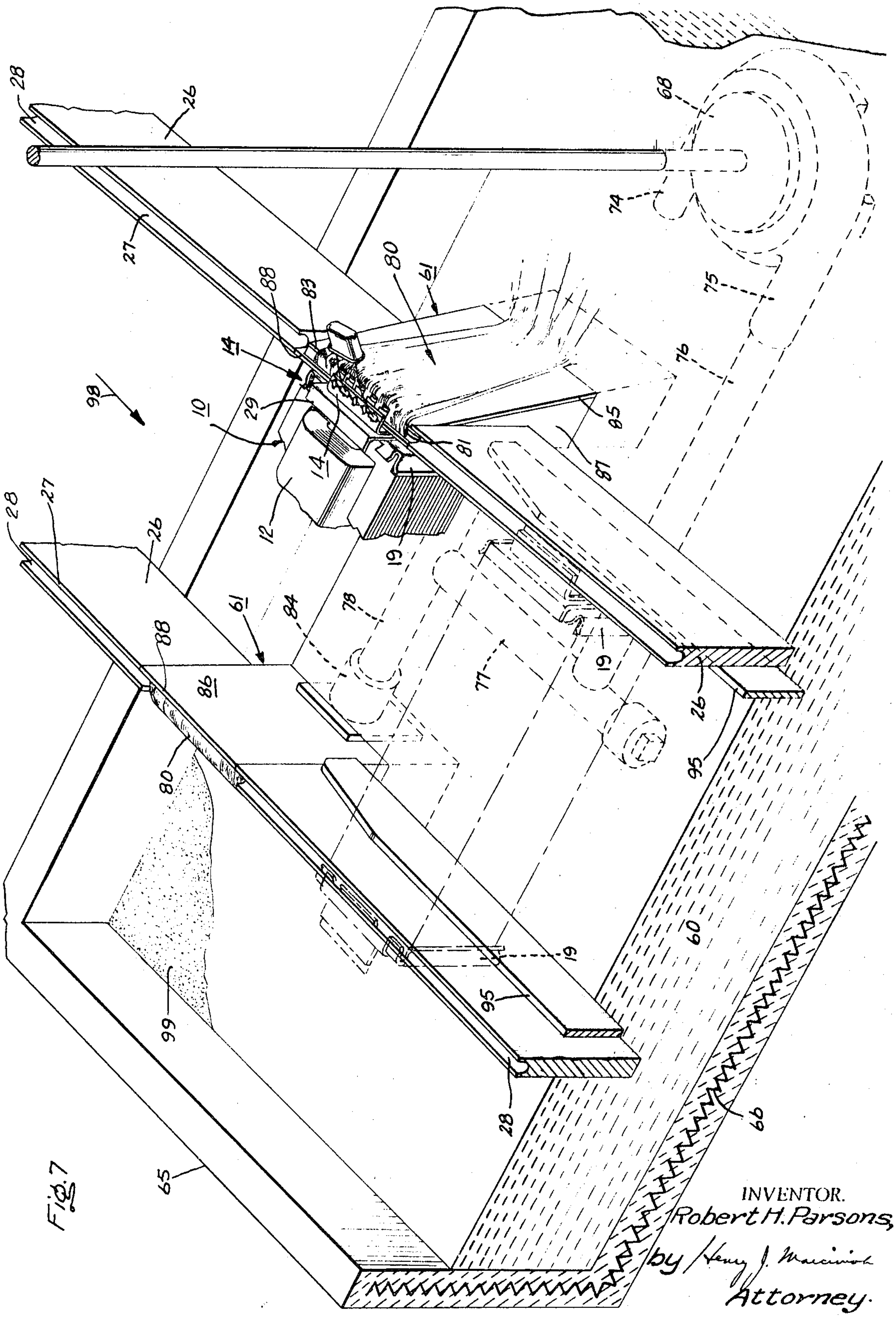
FIG. 7 is an enlarged perspective view with parts broken away, showing a soldering station used in the practice of the invention.

With particular reference to FIG. 7, it will be understood that heating elements 66 disposed in the side walls and base of the solder pot 65 keep the solder 60 molten by maintaining the temperature of the solder above a predetermined level. During operation the pump inlet 74 is positioned below the surface of the solder reservoir and molten solder is discharged under pressure from pump outlet 75 through conduits 76, 77, and 78 to orifices 81. The solder crests and cascades over a lower lip 83 of the orifice 81 in essentially only one direction as shown in FIGS. 6 and 7. I have found in practice that orifices having substantially the same cross sectional configuration can be used at the solder station and flux station. Orifices used in the reduction to practice of the invention had cross sectional configurations as illustrated in FIG. 5.

Again having reference to FIGS. 5 and 6, it will be seen that the orifice 81 has a lower lip 83 and thereby predetermines the direction in which the solder 60 will cascade. It is desirable to present a smooth surface to the terminals and leads and means are preferably provided for reducing pulsations in the supply of solder from the pump. In the exemplification, this means is embodied in the sloping wall 85 opposite the wall 86 and inlet port 84 of the solder duct 61.

As best seen in FIG. 6, the solder flows over the sloping wall 85 of the duct 61. The height of the crest of the solder cascade above the lower lip 83 of the orifice 81 is controlled by adjusting the drive speed of the solder pump 68. To lower the crest height, the speed of the pump 68 is reduced and to increase the crest height, the speed of the pump is increased. The upper lip 88 of the orifices extends about ⅛ of an inch above the top of the walls 85 and 87 forming lower lip 83. It has been found that the crest of both the flux and solder cascades may vary at orifices 41 and 81 by as much as from $\frac{1}{32}$ of an inch below the edge of the upper lip of the orifices to $\frac{1}{32}$ of an inch above that lip.

I have found that by cresting and cascading the flux and solder as illustrated, the fluids are prevented from contacting the windings of the inductive device 10. In addition, the flow of the solder washes asphaltic treat material away from terminals 13 substantially at the same time that the terminals 13 and leads 16, 17 are being tinned and soldered. It will also be understood that only a relatively small amount of oxidation of the solder occurs due to the relatively small surface area of solder exposed to the air in the solder cascade.

It will be appreciated that clean and uniform soldered connections result when using my method and apparatus embodying that method. It will be apparent that when the crest of the solder cascade is level with or slightly above the upper lip 88 of the solder orifice a washing of the terminals 13 will occur as the terminal pad 14 undergoes relative motion with respect to the crest. When the crest is below the lip 88, washing action also results. With the lower crest, as the solder wets the leads 16, 17, the solder also wets portions of the terminals adjacent the leads. It is believed that capillary action at least partially causes the wetting of the terminals during a low crest condition.

In some applications I have found it to be advantageous to slightly raise the inductive device above the conveyor rails 26 for a short period of time after the inductive device has passed along the solder cascade. In the exemplification, as the inductive device 10 travels in the direction of arrow 98 in FIG. 7, a bottom portion of the end clamp 19 rides up on the camming rails 95 and the soldered connections are carried above the conveyor rail 26. With this technique, the formation of solder icicles and the solder bridges between adjacent solder terminals can be substantially reduced, if not eliminated.

In the exemplification, camming rails 95 are approximately 18 inches long and at the end of the camming rails 95 the inductive device 10 drops back down on the conveying rails 26 to be moved therealong to the discharge end of the conveyor.

In the actual reduction to practice of the exemplified apparatus, the roller chains 21 in the conveyor 22 had a pitch of 1¼ inches and were driven by a 1 HP, 1750 r.p.m. motor through a Morse 200:1 speed reducer and a Reaves V-belt variable speed drive. The conveyor speed was variable from 5 to 7 feet per minute and the plates 23 and 24 were mounted on five inch centers.

Crude corn oil was used as a fluxing agent, and a ¼ HP, 1140 r.p.m. motor was used to drive a No. 1 Brown and Sharpe pump. An alternative, and also satisfactory arrangement involved the use of a motorized "Midget Hi-Flo Coolant Pump" also manufactured by the Brown and Sharpe Co. The flux tank 44 had a capacity of about three to four gallons and a conventional Globe valve was used to control the height of the flux fountain.

At the solder Station D, a commercially available solder pot, thermostat, on/off switch and control, identified as a "Type J" by the DEE Electric Company of Chicago, Ill., was used. The solder pump was a Gusher Model No. 9075MPD-long and may be obtained from the Ruthman Machinery Company of Cincinnati, Ohio. The solder pump was driven through a Reaves V-belt variable speed drive by a ¼ HP, 1140 r.p.m. motor.

During operation, a reservoir of about 500 pounds of eutectic solder was maintained at approximately 550 degrees Fahrenheit and replenished as needed. The dross reducing layer of oil 99 over the molten solder was Peblum oil manufactured by the Shell Oil Co.

The overall longitudinal dimension of the flux ducts were two inches and the overall longitudinal dimension of the soldering ducts 61 were four inches. The height of the vertical wall 86 in each duct was 7⅛ inches while the dimension of the sloping wall 85 in each of the ducts 61 was about 7$\frac{5}{16}$ inches. The walls 86 and 85 were spaced from each other approximately ⅛ of an inch at the orifice and 2⅜ inches at the bottom of the duct. The end walls 87 were positioned with respect to each other so that the flux orifice 41 had a longitudinal dimension of about 1 inch and the solder orifice 81 had a longitudinal dimension of about 3 inches. Thus the effective size of the flux orifices were about ⅛ of an inch by 1 inch and the effective solder orifices were about ⅛ of an inch by 3 inches. When assembled, the upper lip 88 of the orifices extended about ⅛ of an inch above the top of the walls 85 and 87.

From the foregoing description, it will be apparent that the present invention makes it possible to consistently make good solder connections between electrical leads and inductive devices. Although in the illustrative exemplification of my invention I have shown and described specific apparatus and manual operations, it will be appreciated that the basic operations performed by hand are adaptable to automated and semi-automatic manufacturing techniques. Also, it will be apparent that the cascades of flux and solder may be moved past the inductive devices rather than having a stationary solder station as shown in the exemplification. The particular embodiments of my invention which I have disclosed clearly illustrate the principles of operation of the invention, and as a result of this disclosure many modifications will be apparent to those skilled in the art. Accordingly, it is to be understood that I intend by the appended claims to cover all such modifications that fall within the true spirit and scope of the invention.

I claim:

1. The method of connecting electrical leads to terminals located adjacent to and supported from an elongate magnetic core and coil assembly, said method comprising: positioning said leads in contact with selected ones of said terminals, and effecting a predetermined relative movement between a cascade of molten solder and the core and coil assembly which prevents the molten solder from contacting the core and coil assembly and which causes the crest of said cascade which is maintained at a predetermined height and the ends of said leads to come into contact with each other thereby to solder said leads and adjacent portions of said terminals.

2. The method of connecting electrical leads to terminals supported from a core and coil assembly as set forth in claim 1 wherein said method further comprises applying a fluxing agent to at least said leads to increase the wettability of the leads and adjacent portions of said terminals.

3. The method of connecting the ends of electrical leads to terminals located adjacent to and supported from a magnetic core and coil assembly, said method comprising: positioning said leads in contact with selected ones of said terminals, and directing a continuous flow of molten solder toward said ends of the electrical leads to wet said ends and adjacent portions of said terminals and to thereby solder the ends of the leads and terminals together while simultaneously directing said flow of molten solder away from the core and coil assembly to prevent molten solder from contacting the core and coil assembly.

4. The method of claim 3 which further includes the step of applying a fluxing agent to at least said ends of the electrical leads to enhance the wettability of the leads by molten solder.

5. The method of connecting the ends of electrical leads to a plurality of aligned terminals extending laterally away from a core and coil assembly, said method comprising: inserting a predetermined length of the electrical leads through openings in said terminals, moving said terminals at a predetermined speed along the crest of a cascade of molten solder while directing the cascade of molten solder laterally away from the core and coil assembly to thereby solder the ends of the leads and terminals together and prevent the molten solder from coming in contact with the core and coil assembly.

6. The method of connecting electrical leads to a plurality of aligned terminals extending laterally away from each end of a core and coil assembly, said method comprising the steps of: placing the electrical leads in engagement with said terminals, inserting a portion of the leads in a fixture to prevent disengagement of the electrical leads from the terminals, moving said core and coil assembly between two cascades of molten solder and adjacent thereto whereby said electrical leads traverse the crests of said cascades of molten solder while directing each of said cascades laterally away from the ends of the core and coil assembly to prevent said solder from splashing on said core and coil assembly.

References Cited

UNITED STATES PATENTS

| | | | |
|---|---|---|---|
| 1,708,756 | 4/1929 | Fagan et al. | 228—43 |
| 1,994,436 | 3/1935 | Przyborowski | 228—43 |
| 2,515,097 | 7/1950 | Schryber | 228—43 |
| 3,016,854 | 1/1962 | Giles | 228—43 |
| 3,108,560 | 10/1963 | Bowne | 228—43X |
| 3,253,761 | 5/1966 | Baldwin, Jr., et al. | 228—49X |
| 3,379,356 | 4/1968 | Eith | 228—37 |
| 3,386,166 | 6/1968 | Tardoskegyi | 228—37X |
| 2,756,485 | 7/1956 | Abramson | 29—471.1X |
| 2,870,532 | 1/1959 | Young | 29—503X |
| 3,056,370 | 10/1962 | Barnes et al. | 29—471.1X |
| 3,277,566 | 10/1966 | Christensen | 29—471.1 |
| 3,445,919 | 5/1969 | Saba | 29—471.1 |

JOHN F. CAMPBELL, Primary Examiner

R. B. LAZARUS, Assistant Examiner

U.S. Cl. X.R.

29—488, 503